United States Patent Office 2,817,737
Patented Dec. 24, 1957

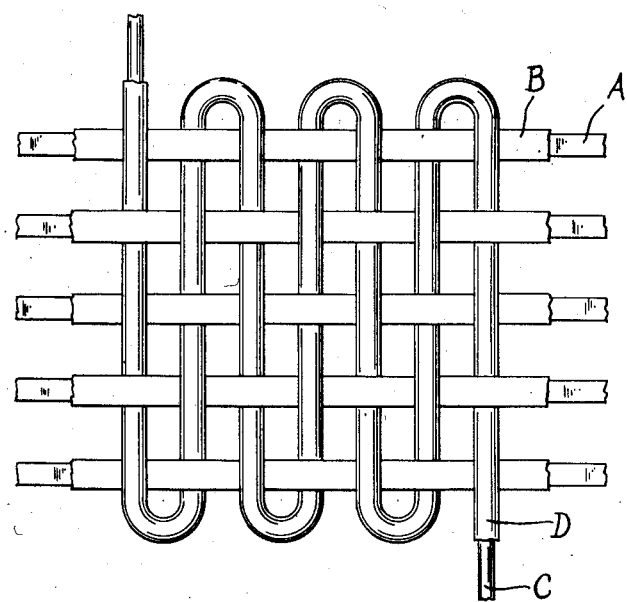

2,817,737
ELECTRICAL RESISTANCE NETS

William Warder Morris, Haddam, Conn., assignor of one-half to Carlos B. Ellis, Middletown, and one-half to Jean K. Morris, Haddam, Conn.

Application February 10, 1954, Serial No. 409,487

6 Claims. (Cl. 201—63)

This invention relates to a device using electric current for resistance purposes, whether these purposes be for heating in a variety of temperature ranges, or whether the device be used for voltage control. This device is in the form of a mesh net or mat, well known to those skilled in the art, and consisting of interlacing members often referred to as warp and/or filling, whether made on looms, knitters, or by peg boards. Those skilled in the art also know that the useful operation of such devices is limited to the nature of the materials used in the construction, for example, if an electrically non-conductive material is used to separate wires, the nature of said material obviously limits temperature. Asbestos, glass fiber yarns, plastics, plastic filaments, such as nylon and polyesters, are relatively immune to destruction at low temperatures. It has been noted, however, that even asbestos and glass fiber yarns have a tendency to calcine as temperatures rise above 600° Fahrenheit. Between 800° and 900° Fahrenheit calcination with subsequent powdering occurs with certainty and relatively quickly; asbestos having the additional disadvantage of being hydroscopic and containing trace minerals, which frequently set up a cell action against wire, causing gradual disintegration. In the case of glass fibers, organic coatings of fillings are driven off at relatively low temperatures, and the glass structures as above mentioned calcine as previously indicated. Also, in the case of asbestos, ceramic fillers used to set the mat, reduce flexibility where such a property is desirable, and in some cases, at elevated temperatures become conductors. The above limitations combine to restrict the use of previous structures for many applications such as heating elements for commercially used devices such as toasters, broilers, infra-red drying devices, aircraft de-icing, instrument heating, etc. My invention circumvents the temperature restrictions of the prior art and adds advantages extending the usefulness of electrical resistance nets.

By using a flat metallic strip or ribbon as a supporting member to the current carrying portions of the mat, the following advantages become apparent. The thermal conductivity of the flat metallic ribbon in intimate contact with the current carrying members tends to remove heat from said current carrying members by conduction and increase convective loss throughout the mat. If the flat metallic members are insulated with glass fibers, asbestos fibers or ceramic coatings, said flat metallic supporting members also improve the radiation of energy away from the structure. This fact is made possible by the superior emissive quality of the above-mentioned materials and the thermal strains and shocks offered to these materials are less because the flat metallic member by conduction contributes to the distribution of energy throughout the mass and aids in energy release from the mass as hereinbefore indicated. Round metallic members are not as advantageous because it is more difficult to build a structure with desirable thermal characteristics and with proper electrical insulation between the current carrying members and the supporting members of the structure. In cases where round wires are used against round wires, contact area between members is reduced and the structure is mechanically less secure than the means provided in this invention. Also, if round wires are used in an uninsulated condition, said round wires are more likely to abraid and float into the insulation areas and reduce the efficiency of electrical insulation.

Therefore, it is apparent that my invention, heretofore not known to the prior art, resides primarily in the novel and useful combination of materials in forms which extend the operational limits of resistance nets beyond the range heretofore possible in the art. Further advantages accrue from these constructions to be described further in that conditions of mounting the elements in various devices are improved since flexibility and pliability are not lost but dimensional relationships between members are improved. These characteristics become more markedly apparent if a ductile metallic ribbon is used. This inclusion in one or both directions of the net will obviously increase formability. Flat members by reason of increased contact area naturally improve thermal transfer by conduction and provide increased radiation surface.

In order to achieve the results described above, one method of practicing my invention is to take an aluminum ribbon of approximately .007 thickness by .0062 width and insert said ribbon as the core of a fiber glass braided tube made on a standard Butt braiding machine. The machine will handle this material with relatively little difficulty. It is well known, however, that glass fibers untreated are subject to abrasion in handling. It is also true that resins, hydrogenated vegetable oils and similar materials are placed on said glass fibers to facilitate commercial handling in the production of devices involving these materials. It is equally true that in the release of these materials by heat, care must be taken to avoid the presence of residual carbons, which would result in carbon shorts occurring between the internal metallic core and any electrically uninsulated material placed against the structure. Therefore, before incorporating the aforementioned flat metallic ribbon, insulated with glass fiber, into a mat of net-like structure, it is important to heat treat the material coming from the braider for approximately one hour and a half in ambient temperature of from 550° to 600° Fahrenheit. This caramelizes any vegetable oils and gives a slight shrinking and setting action to the fibers so that they are less subject to external abrasion, and in addition to this, the braid loses mass so that adherence to the core is improved. This makes the material easier to work, and when temperatures in excess of 700° Fahrenheit are applied by $I^2R$ drop across the conducting members of the circuit, further release of any carbon inclusions is such that residual carbon in the structure is negligible. If the current conducting members, either flat or round, in the structure are further insulated with glass fibers, and the operating temperatures of the desired unit are to be in excess of the operational limits of organic varnishes, silicone varnishes, silicone rubbers, et al., it is also important that such materials be also heat treated for the same reasons. Asbestos fiber materials used as electrical insulators are not as frequently desirable, but nevertheless can be used, if the limitations of asbestos are kept in mind. When the materials for supporting members and/or the current carrying members, or both, are properly placed, the structures may be assembled on hand looms, peg boards, and certain types of power looms, depending on the size and nature of the conducting wires or ribbons, such as solid versus stranded, to be used. Where dimensional thinness or high di-electric of the internal members is required, the use of ceramic coatings may be indicated. One such material commercially available is Du Pont's non-crazing aluminum enamel. At lower temperatures, of course, plastic extrusions of nylon or coatings of nylon type enamels will achieve satisfactory results. If operating temperatures of the unit desired go up, it may be desirable to use in place of aluminum cores, such materials as nickel clad copper flat ribbon or silver clad copper flat ribbon. It is also relatively simple to draw into the current carrying circuit fine wires of high specific resistance. Care must be taken to finish off the ends of any non-conducting flat metallic members so that the bare ribbon is not in contact with a bare conductor. This may be accomplished quite readily in the case of glass by heat sealing or by insulating varnishes. Should it become necessary in exceptional design conditions to provide a structure in which both lateral and longitudinal members carry current, it is extremely important that a temperature differential exists between the opposing circuits. If this is not done, second law principles will be violated with the resultant thermal shocks and stresses leading to hot spots which will in turn destroy the internal dielectric values of the structure, and cause breakdown particularly at elevated temperatures. It is well to note that one of the limitations of the prior art in which non-metallic materials are used as supporting members is that hot spot temperatures increase in number and intensity as current values increase.

In the drawing there is illustrated by way of example a fragmentary view of a resistance net embodying the invention, the net being shown in plan.

In the embodiment of the invention shown in the drawing, the reference character A indicates a series of flexible, flat metallic wires or ribbons each of which, in the instant form, is covered by a dielectric element B formed of braided glass fibers, for example, the ribbons being spaced apart and being disposed approximately parallel to one another. The series of ribbons, indicated at A, serves, not as an electrical conductor in the instant form, but as a conductor of thermal energy throughout the net and also as a supporting element for one or more electrical conductors or resistance wires, one being shown in the drawing and indicated at C. The conductor C is woven through the aforementioned ribbons so as to present substantially straight portions extending transversely of the ribbons and curved portions electrically connecting said straight portions at their ends. The ends of the wire C may project from the net for connection to a suitable source of current. The conductor wire C in the instant form is round in cross section, and except for the end portions thereof, is covered by a dielectric element D formed of glass fiber material, for example. Due to the flattened cross section of the insulated supporting wires or ribbons, a large area thereof is exposed for contact by the insulated electrical conductor. Furthermore, it will be understood that the metallic ribbons provide optimum thermal transfer by conduction and provide increased radiation surface area in a flexible electrical resistance net which, if desired, may be conformed quite readily to a curvilinear supporting surface such as a curved airfoil, for example.

Having thus described my invention, what I claim is:

1. An electrical resistance net comprising a series of elongate flexible electrical resistance members disposed in substantially parallel relationship and provided with terminal means for connection to a source of electrical current, a series of elongate metallic members in fixed relation to the members of the first series and disposed in substantially parallel relation to each other, the members of the second series extending transversely of the members of the first series, and insulating means intermediate the members of the first and second series, the metallic members of the second series being formed of flexible flat ribbon to provide a flexible net, and the last-mentioned members constituting conductors for transfer of thermal energy in the net from and laterally of the resistance members.

2. In an electrical resistor, a series of flexible metallic ribbons each having a portion thereof disposed in substantially parallel relation to a portion of another, a flexible resistance wire having a portion thereof woven through and extending transversely of said ribbon portions in fixed relation thereto and having end portions for connection to a source of electrical current, and insulating means intermediate said resistance wire and said ribbons, said ribbons constituting conductors for transfer of thermal energy laterally of said resistance wire.

3. In an electrical resistor, a flexible resistance wire having reverse loops formed therein to provide a series of approximately straight wire portions in laterally spaced apart and substantially parallel relationship, the resistance wire having portions thereof for connection to a source of electric current, a flexible metallic ribbon in fixed relation to said resistance wire and extending transversely of said wire portions, and insulating means intermediate said wire and said ribbon, said ribbon constituting a conductor of thermal energy laterally of said wire portions.

4. In a flexible woven net for use as a resistor, a warp constituted by a series of members formed of wire, a weft constituted by a series of members formed of wire, and insulating means intermediate the warp and the weft members, the members of at least one series being formed of wire of flattened cross section, and at least one of said series being connectible to a source of electric current.

5. In an electrical resistance net, the combination of a series of flat metallic ribbons extending in substantially parallel relation to one another, a resistance wire of round cross section and having parts thereof connectible to a source of electrical current, said resistance wire having reverse loops formed therein to provide a series of approximately straight wire portions in substantially parallel relationship to each other, said wire portions being woven through said ribbons, and said resistance wire being provided with a dielectric cover throughout the length of the wire except in the region of said parts thereof, said ribbons constituting conductors of thermal energy throughout the net.

6. A resistance net as defined in claim 5 wherein each of said ribbons is completely encased in a dielectric cover.

References Cited in the file of this patent

UNITED STATES PATENTS

| | | |
|---|---|---|
| 919,402 | Trumpler | Apr. 27, 1909 |
| 1,031,204 | Schniewindt | July 2, 1912 |
| 1,833,761 | Stranszky | Nov. 24, 1931 |
| 1,962,673 | Wilms | June 12, 1934 |